US009842307B2

(12) United States Patent
Vaya et al.

(10) Patent No.: US 9,842,307 B2
(45) Date of Patent: Dec. 12, 2017

(54) METHODS AND SYSTEMS FOR CREATING TASKS (71) Applicant: Xerox Corporation, Norwalk, CT (US)

(72) Inventors: Shailesh Vaya, Bangalore (IN); Akshayaram Srinivasan, Tamil Nadu (IN); Sai Praneeth Reddy K, Bangalore (IN)

(73) Assignee: XEROX CORPORATION, Norwalk, CT (US)

( * ) Notice: Subject to any disclaimer, the term of this patent is extended or adjusted under 35 U.S.C. 154(b) by 1041 days.

(21) Appl. No.: 14/083,573

(22) Filed: Nov. 19, 2013

(65) Prior Publication Data
US 2015/0142502 A1 May 21, 2015

(51) Int. Cl.
G06Q 10/00 (2012.01)
G06Q 10/06 (2012.01)

(52) U.S. Cl.
CPC .............................. G06Q 10/06316 (2013.01)

(58) Field of Classification Search
None
See application file for complete search history.

(56) References Cited

U.S. PATENT DOCUMENTS

| 5,159,667 | A * | 10/1992 | Borrey | G06F 17/30011 382/171 |
| 6,859,523 | B1 * | 2/2005 | Jilk | G06Q 10/06 379/265.01 |
| 7,254,837 | B2 * | 8/2007 | Fields | G06F 21/606 709/203 |
| 7,945,470 | B1 * | 5/2011 | Cohen | G06Q 10/06 455/433 |
| 8,255,258 | B1 * | 8/2012 | Cohen | G06Q 10/06 705/7.21 |
| 8,583,721 | B2 * | 11/2013 | Kibler | G06Q 10/10 709/202 |
| 8,793,756 | B2 * | 7/2014 | Mock | G06Q 10/06 705/301 |
| 8,824,785 | B2 * | 9/2014 | Ives | G06K 9/00449 382/164 |
| 8,959,654 | B2 * | 2/2015 | Avrahami | G06F 21/10 726/27 |
| 9,262,643 | B2 * | 2/2016 | Cidon | G06F 21/6218 |

(Continued)

OTHER PUBLICATIONS

Rekatsinas, T. et al., "SPARSI: partitioning sensitive data amongst multiple adversaries" (Aug. 2013), Proceedings of the VLDB Endowment: vol. 6, Iss. 13, pp. 1594-1605.*

(Continued)

Primary Examiner — Tiphany Dickerson
(74) Attorney, Agent, or Firm — Jones Robb PLLC (57) ABSTRACT

Methods and systems for creating one or more tasks. One or more electronic documents are clustered in one or more first groups based on a similarity of handwriting in the one or more electronic documents. Each electronic document of each of the one or more first groups is partitioned into one or more partitions. Each of the one or more partitions is assigned an area identification number. The one or more tasks are created such that each task of the one or more tasks includes a partition, from each electronic document of the one or more electronic documents, having same area identification number.

12 Claims, 5 Drawing Sheets

(56) References Cited

U.S. PATENT DOCUMENTS

| | | | | |
|---|---|---|---|---|
| 2009/0199185 A1* | 8/2009 | Slawson | ............... | G06Q 10/06 718/100 |
| 2012/0054112 A1* | 3/2012 | Gormish | ............. | G06Q 10/103 705/301 |
| 2012/0265578 A1* | 10/2012 | Olding | .................. | G06Q 10/06 705/7.25 |
| 2015/0044654 A1* | 2/2015 | Lendvay | ............... | G09B 23/28 434/262 |

OTHER PUBLICATIONS

Shah, N. et al., "Secret Share Dissemination across a Network" (Jul. 4, 2013) (version 4) accessed at: https://arxiv.org/pdf/1207.0120v4.pdf.*
U.S. Appl. No. 13/870,006, filed Apr. 25, 2013; Method and System for Facilitating Retrieval of Information From Images; Wu et al.
U.S. Appl. No. 13/567,110, filed Aug. 6, 2012; Method and System for Processing Application Forms; Piratla et al.
U.S. Appl. No. 13/909,181, filed Jun. 4, 2013; Methods and Systems for Crowdsourcing a Task; Balamurugan et al.

* cited by examiner

METHODS AND SYSTEMS FOR CREATING TASKS

CROSS-REFERENCE TO RELATED APPLICATION

The present application is related to U.S. Non-Provisional application Ser. No. 14/083,560, filed Nov. 19, 2013, entitled "METHODS AND SYSTEMS FOR RECOGNIZING HANDWRITING IN HANDWRITTEN DOCUMENTS", the contents of which are herein incorporated by reference (File No. 20130490US01).

TECHNICAL FIELD

The presently disclosed embodiments are related, in general, to crowdsourcing. More particularly, the presently disclosed embodiments are related to methods and systems for creating one or more tasks for crowdsourcing.

BACKGROUND

Crowdsourcing has emerged as a convenient and economical method for organizations to outsource certain tasks, which require human involvement. For example, tasks such as digitization of a handwritten document, labeling of an image, and anomaly detection in a video may be uploaded by a requester on one or more crowdsourcing platforms. Crowdworkers associated with the crowdsourcing platforms may attempt such tasks.

However, one of the major issues while crowdsourcing tasks has been privacy violation. Generally, the tasks are created such that the crowdworkers performing the tasks may access and subsequently misuse the private information available in the tasks. As an example, while performing a task that involves handwriting recognition in an insurance form, crowdworkers may collect and misuse sufficient private information, such as a name, an address, a phone number, an email address, a social security number and so forth. In view of the above, there remains a need for creating the tasks, taking care of associated privacy concerns.

SUMMARY

According to embodiments illustrated herein, there is provided a method for creating one or more tasks. The method includes clustering one or more electronic documents in one or more first groups based on a similarity of handwriting in the one or more electronic documents. The method further includes, for each group in the one or more first groups: partitioning each electronic document into one or more partitions, assigning an area identification number to each of the one or more partitions, and creating the one or more tasks, wherein each task of the one or more tasks includes a partition, from each electronic document of the one or more electronic documents, having same area identification number. The method is performed by one or more processors.

According to embodiments illustrated herein, there is provided a system for creating one or more tasks. The system includes one or more processors operable to cluster one or more electronic documents in one or more first groups based on a similarity of handwriting in the one or more electronic documents. For each group in the one or more first groups, the one or more processors are further operable to: partition each electronic document into one or more partitions, assign an area identification number to each of the one or more partitions, and create the one or more tasks, wherein each task of the one or more tasks includes a partition, from each electronic document of the one or more electronic documents, having same area identification number.

According to embodiments illustrated herein, there is provided a computer program product for use with a computer. The computer program product includes a non-transitory computer readable medium. The non-transitory computer readable medium stores a computer program code for creating one or more tasks. The computer program code is executable by one or more processors to cluster one or more electronic documents in one or more first groups based on a similarity of handwriting in the one or more electronic documents. For each group in the one or more first groups, the program code is further executable by the one or more processors to partition each electronic document into one or more partitions, assign an area identification number to each of the one or more partitions, and create the one or more tasks, wherein each task of the one or more tasks includes a partition, from each electronic document of the one or more electronic documents, having same area identification number.

BRIEF DESCRIPTION OF DRAWINGS

The accompanying drawings illustrate various embodiments of systems, methods, and other aspects of the disclosure. Any person having ordinary skill in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit the scope in any manner, wherein like designations denote similar elements, and in which.

DETAILED DESCRIPTION

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternate and suitable approaches to implement the functionality of any detail described herein. Therefore, any approach may extend beyond the particular implementation choices in the following embodiments described and shown.

References to "one embodiment", "an embodiment", "at least one embodiment", "one example", "an example", "for example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Definitions

The following terms shall have, for the purposes of this application, the respective meanings set forth below.

"Crowdsourcing" refers to distributing tasks by soliciting the participation of defined groups of users. A group of users may include, for example, individuals responding to a solicitation posted on a certain website (e.g., crowdsourcing platform), such as Amazon Mechanical Turk or Crowd Flower.

A "crowdsourcing platform" refers to a business application, wherein a broad, loosely defined external group of people, community, or organization provides solutions as outputs for any specific business processes received by the application as input. In an embodiment, the business application may be hosted online on a web portal. Various examples of the crowdsourcing platforms include, but are not limited to, Amazon Mechanical Turk or Crowd Flower.

A "crowdworker" refers to a worker or a group of workers that may perform one or more crowdsourcing tasks that generate data that contribute to a defined result, such as proofreading part of a digital version of an ancient text or analyzing a small quantum of a large volume of data. In an embodiment, using the crowdsourcing platform, the crowdworker performs the one or more crowdsourcing tasks corresponding to the digitization of handwritten documents. Hereinafter, "remote worker", "worker", "crowdsourced workforce", "crowdworker", "crowd workforce", and "crowd" may be interchangeably used.

An "electronic document" refers to a digitized copy of a document (e.g., of paper). The electronic document may be obtained by scanning the document using a scanner, a multifunctional device (MFD), or other similar devices. Further, in an embodiment, the document corresponds to an insurance form including handwritten content, which the crowdworker has to digitize. The electronic document can be stored in various file formats, such as, JPG or JPEG, GIF, TIFF, PNG, BMP, RAW, PSD, PSP, PDF, and the like.

A "first group" of electronic documents refers to a collection of the electronic documents having similar handwriting. In an embodiment, the one or more electronic documents may be inputted to a clustering algorithm to generate one or more first groups such that each first group has one or more electronic documents with similar handwriting. The similarity of the handwriting may be identified using image recognition technologies known in the art. In an alternate embodiment, the similarity of the handwriting may be identified by using crowdsourcing.

A "second group" of electronic documents refers to a collection of the electronic documents that is a subset of the first group. One or more second groups may be generated from a first group. In an embodiment, the one or more first groups generated by the clustering algorithm may include a large number of electronic documents. Therefore, each first group is further divided into one or more second groups.

"Partitioning" refers to a process of dividing each electronic document into one or more partitions. In an embodiment, the partitioning is performed such that a crowdworker, who receives the one or more partitions in the one or more tasks, cannot identify the complete information pertained in the electronic document. In a scenario where the electronic document corresponds to an insurance form, the one or more partitions may include various types of information, such as a name, an address, a phone number, an email address, a social security number, etc., corresponding to a user.

A "pre-processed identification field" refers to an identification string that uniquely identifies the partition and its corresponding electronic document. In an embodiment, a unique pre-processed identification field includes three parts: a first part is indicative of an electronic document, a second part is indicative of a partition in the electronic document, and a third part is a random number.

An "area identification number" refers to an identification string that is a subset of the pre-processed identification field. In an embodiment, the area identification number corresponds to the second part of the pre-processed identification field, i.e., the part that is indicative of the partition in the electronic document. The area identification number may be used while creating the one or more tasks.

A "post-processed identification field" refers to an identification string that may be used by the crowdworker to browse through the one or more partitions in each of the one or more tasks. In an embodiment, the post-processed identification field corresponding to the partition may be generated by applying a trapdoor function on the pre-processed identification field.

Figure 1:
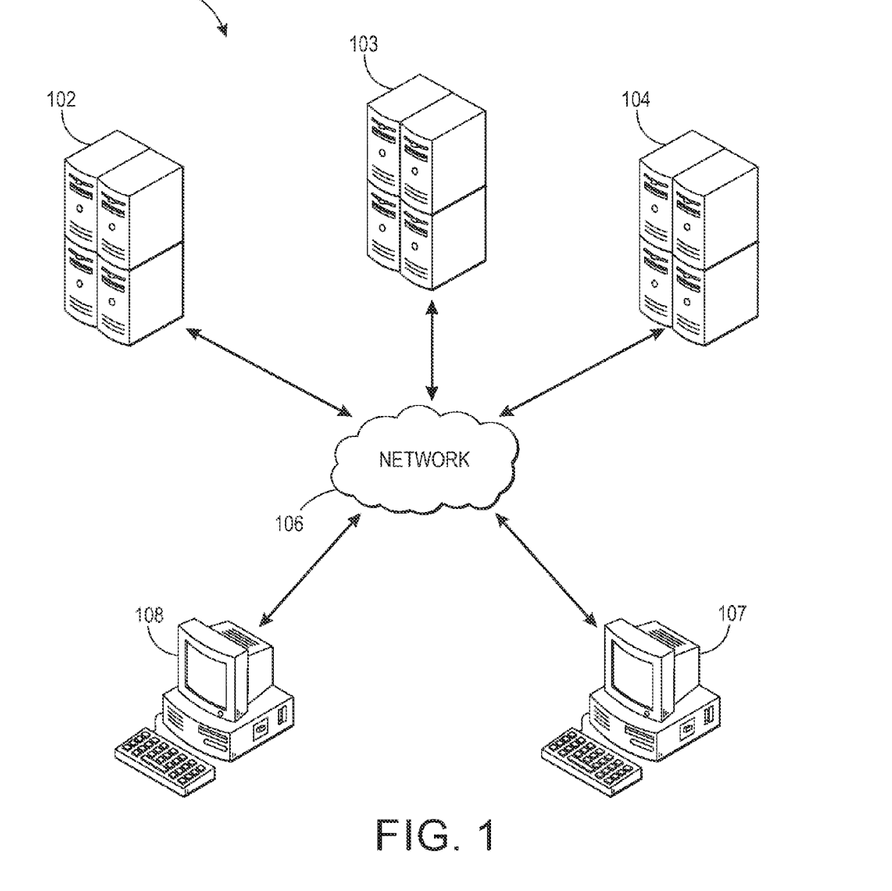
FIG. 1 is a block diagram illustrating a system environment in which various embodiments may be implemented.

FIG. 1 is a block diagram illustrating a system environment 100 in which various embodiments may be implemented. The system environment 100 includes an application server 102, a crowdsourcing platform server 103, a database server 104, a network 106, a requester-computing device 107 and a worker-computing device 108. The application server 102, the crowdsourcing platform server 103, the database server 104, the requester-computing device 107, and the worker-computing device 108 are interconnected over the network 106.

The application server 102 is capable to host an application/tool/framework for creating one or more tasks, in accordance with at least one embodiment. In an embodiment, a requester (e.g., an insurance service provider who wants to get handwritten forms digitized) accesses the application server 102 and submits one or more electronic documents. The application server 102 clusters the one or more electronic documents into one or more first groups. The one or more electronic documents are clustered such that each of the one or more first groups has electronic documents with similar handwriting. Further, the application server 102 generates one or more second groups from each of the one or more first groups. The application server 102 partitions each electronic document into one or more partitions. Thereafter, based on the partitioning, the application server 102 creates the one or more tasks. The creation of the one or more tasks has been described later in conjunction with FIG. 3. Some examples of the application server 102 may include, but are not limited to, Java application server, .NET framework, and Base4 application server.

The crowdsourcing platform server 103 may refer to a device or a computer that hosts one or more crowdsourcing platforms. In an embodiment, the crowdsourcing platform server 103 receives the one or more tasks from the application server 102. Further, the crowdsourcing platform server 103 may communicate the one or more tasks to the one or more remote workers associated with the crowdsourcing platforms. In an embodiment, the crowdsourcing platform server 103 present a user interface (UI) to the one or more remote workers through a web based interface or a client application. The one or more remote workers may access the one or more tasks through the web based interface or the client application. Further, the one or more remote workers may submit a final response for the task to the crowdsourcing platform server 103 through the web based interface or the client application. In an alternate embodiment, the crowdsourcing platform server 103 may itself host the application for creating the one or more tasks. The crowdsourcing platform server 103 may be realized through an application server such as, but not limited to, Java application server, .NET framework, and Base4 application server.

In yet another embodiment, the application for creating the one or more tasks may also be installed on the requester-computing device 107 without departing from the scope of the invention.

The database server 104 may refer to a device or a computer that maintains a repository of the tasks assigned to the crowdworkers. In an embodiment, the database server 104 may store the one or more electronic documents, information pertaining to the grouping of the one or more electronic documents. The database server 104 may receive a query from the application server 102 or the crowdsourcing platform server 103 to retrieve data pertaining to the tasks. For querying the database server 104, one or more querying languages may be utilized such as, but not limited to, SQL, QUEL, DMX, and so forth. Further, the database server 104 may be realized through various technologies, such as, but not limited to, Microsoft® SQL server, Oracle®, and My SQL®. In an embodiment, the application server 102 or the crowdsourcing platform server 103 may connect to the database server 104 using one or more protocols such as, but not limited to, ODBC protocol and JDBC protocol.

A person skilled in the art would understand that the scope of the disclosure should not be limited to the database server 104 as a separate entity. In an embodiment, the functionalities of the application server 102 and the database server 104 may be combined into a single server, without departing from the scope of the disclosure. In an alternate embodiment, functionalities of the application server 102 and the database server 104 may be integrated into the crowdsourcing platform server 103.

The network 106 corresponds to a medium through which content and messages flow between various devices of the system environment 100 (e.g. the worker-computing device 108, the database server 104, the application server 102, the crowdsourcing platform server 103, and the requester-computing device 107). Examples of the network 106 may include, but are not limited to, a Wireless Fidelity (Wi-Fi) network, a Wide Area Network (WAN), a Local Area Network (LAN), or a Metropolitan Area Network (MAN). Various devices in the system environment 100 can connect to the network 106 in accordance with various wired and wireless communication protocols such as Transmission Control Protocol and Internet Protocol (TCP/IP), User Datagram Protocol (UDP), and 2G, 3G, or 4G communication protocols.

The requester-computing device 107 may refer to a computing device, used by the requester, to upload the one or more electronic documents. In an embodiment, the requester may access the application server 102 to upload the one or more electronic documents. In an alternate embodiment, the requester may access the crowdsourcing platform server 103 to upload the one or more electronic documents. The requester may upload the one or more electronic documents using a variety of computing devices, such as a laptop, a personal digital assistant (PDA), a tablet computer, and the like.

The worker-computing device 108 refers to a computing device, used by the one or more crowdworkers, to perform the one or more tasks. In an embodiment, the worker-computing device 108 receives a user interface (UI) from the crowdsourcing platform server 103. The one or more tasks may be presented to the crowdworker through the UI. Further, the crowdworker may submit the response through the UI. The crowdworkers may perform the tasks using a variety of computing devices, such as a laptop, a personal digital assistant (PDA), a tablet computer, and the like.

Figure 2:
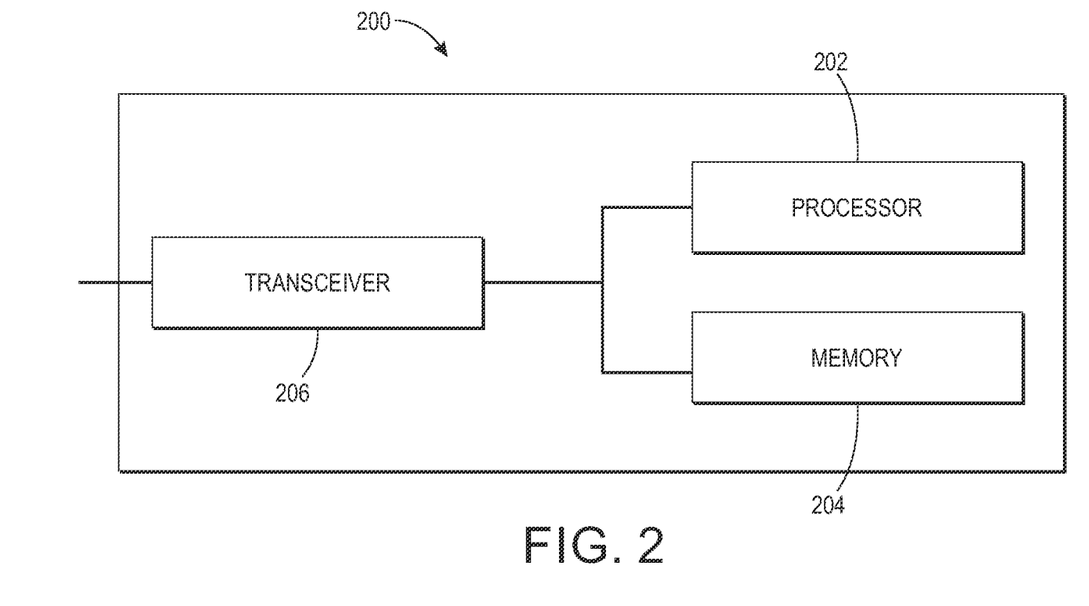
FIG. 2 is a block diagram illustrating a system for creating one or more tasks, in accordance with at least one embodiment.

FIG. 2 is a block diagram illustrating a system 200 for creating one or more tasks, in accordance with at least one embodiment. The system 200 includes a processor 202, a memory 204, and a transceiver 206. Although for the purpose of ongoing description, the system 200 has been considered the application server 102, the system 200 may also correspond to the requester-computing device 107 or the crowdsourcing platform server 103 without departing from the scope of the disclosure.

The processor 202 is coupled to the memory 204 and the transceiver 206. The processor 202 includes suitable logic, circuitry, and/or interfaces that are operable to execute one or more instructions stored in the memory 204 to perform predetermined operation. The memory 204 may be operable to store the one or more instructions. The processor 202 may be implemented using one or more processor technologies known in the art. Examples of the processor 202 include, but are not limited to, an X86 processor, a RISC processor, an ASIC processor, a CISC processor, or any other processor.

The memory 204 stores a set of instructions and data. Some of the commonly known memory implementations include, but are not limited to, a random access memory (RAM), a read only memory (ROM), a hard disk drive (HDD), and a secure digital (SD) card. Further, the memory 204 includes the one or more instructions that are executable by the processor 202 to perform specific operations. It is apparent to a person having ordinary skills in the art that the one or more instructions stored in the memory 204 enables the hardware of the system 200 to perform the predetermined operation.

The transceiver 206 transmits and receives messages and data to/from various components of the system environment 100 (e.g., the crowdsourcing platform server 103, the database server 104, the requester-computing device 107, and the worker-computing device 108). Examples of the transceiver 206 may include, but are not limited to, an antenna, an Ethernet port, an USB port or any other port that can be configured to receive and transmit data. The transceiver 206 transmits and receives data/messages in accordance with the various communication protocols, such as, TCP/IP, UDP, and 2G, 3G, or 4G communication protocols.

Figure 3:
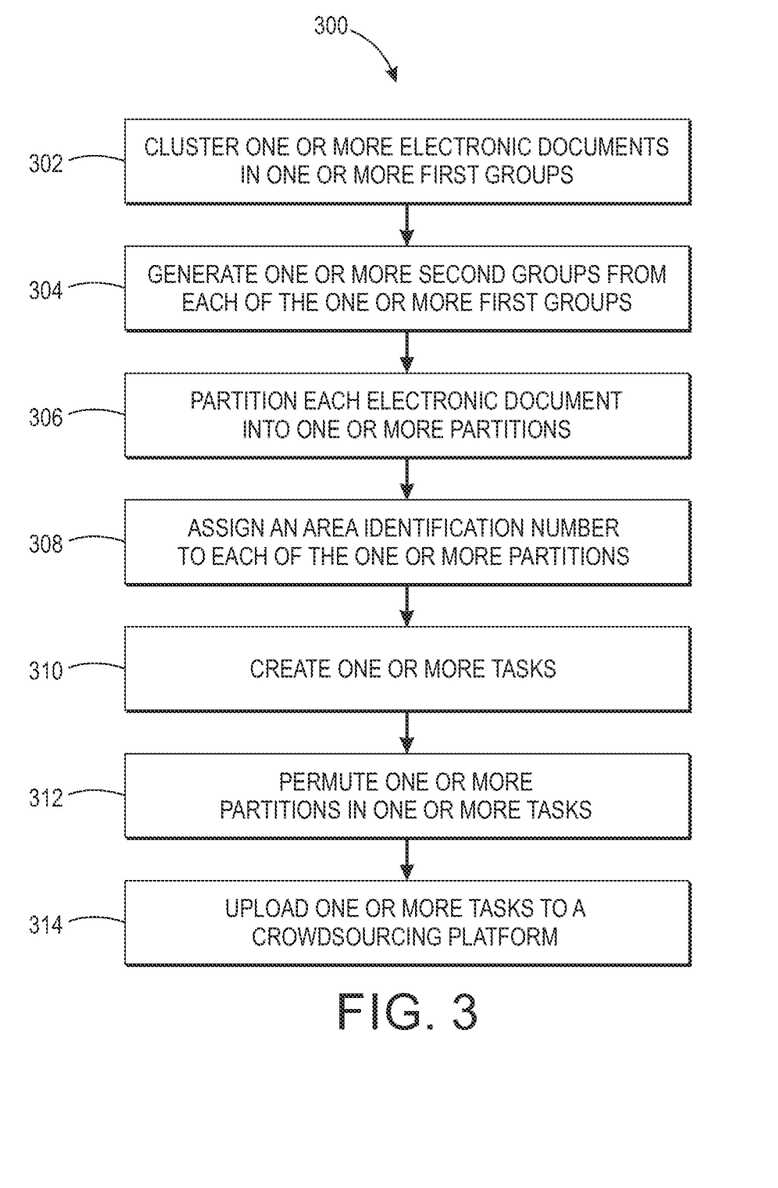
FIG. 3 is a flowchart illustrating a method for creating one or more tasks, in accordance with at least one embodiment.

The operation of the system 200 for creating one or more tasks has been described in conjunction with FIG. 3.

FIG. 3 is a flowchart 300 illustrating a method for creating one or more tasks, in accordance with at least one embodiment. The flowchart 300 is described in conjunction with FIG. 1 and FIG. 2.

At step 302, the one or more electronic documents are clustered in the one or more first groups. In an embodiment, the processor 202 may cluster the one or more electronic documents in the one or more first groups based on the similarity of handwriting in the one or more electronic documents such that the one or more electronic documents in any of the first groups have similar handwriting. The processor 202 may identify the handwriting in the one or more electronic documents using handwriting recognition techniques known in the art and may subsequently cluster the one or more electronic documents.

In an alternate embodiment, the similarity of the handwriting in the one or more electronic documents may be obtained through crowdsourcing. For example, for any two electronic documents from the one or more electronic documents, several micro-tasks may be created by taking different portions from the two electronic documents. The micro-tasks may be transmitted to crowdworkers for categorizing the portions based on the similarity of handwriting. Based on received categorization, the similarity of the handwriting may be identified for any pair of the electronic documents.

At step 304, electronic documents in each of the one or more first groups are further divided in the one or more second groups. In an embodiment, the clustering of the one or more electronic documents in the one or more first groups may return a large number of electronic documents in many of the first groups. Thus, there remains a need for further dividing the electronic documents in the first group into the one or more second groups. In an embodiment, the number of electronic documents in each of the second groups may be same. It will be apparent to a person having ordinary skill in the art that the step 304 pertaining to the generation of the one or more second groups may be skipped and step 306 may directly be followed after step 302.

At step 306, each electronic document of each second group is partitioned into the one or more partitions. In an embodiment, the processor 202 may partition each electronic document into the one or more partitions such that no partition reveals the complete privacy information about a user associated with the electronic document. For example, if the one or more electronic documents correspond to insurance forms that include private information, such as name, address, email id, telephone number, etc., the partitioning of the one or more electronic documents is performed such that the crowdworkers performing the tasks of the digitization of the electronic documents can not relate different information (e.g., name, address, email id, telephone number, etc.) with the associated user. Further, each electronic document of each second group is partitioned similarly, i.e., for any two electronic documents, the shape of partitions and count of partitions in two electronic documents are same. Hence, each partition in any electronic document will have one corresponding partition in the other electronic document. Further illustration of the partitioning of the one or more electronic documents is described in conjunction with FIG. 4.

At step 308, the one or more partitions are assigned an area identification number. The processor 202 assigns the area identification number to each of the partitions. In an embodiment, total number of the electronic documents are f and total number of partitions in each electronic document is m. The area identification number, in such a scenario, contains [lg m] bits to identify each of the partitions uniquely. Further, the processor 202 assigns [lg f] bits to identify each of the electronic documents uniquely. Based on the [lg f] bits and [lg m] bits, the processor 202 generates a pre-processed identification field. In an embodiment, the pre-processed identification field includes [lg f] bits, [lg m] bits, and s random bits. As the number of partitions in each of the one or more electronic documents is same, the number bits required to uniquely identify the partitions in each of the one or more electronic documents is also same. Further, in an embodiment, each corresponding partition of the one or more electronic documents (which have been partitioned similarly) will have the same value. Further details and illustration of the area identification number has been described in conjunction with FIG. 4.

Further, in an embodiment, the processor 202 assigns a post-processed identification field to each partition of the one or more electronic documents. The post-processed identification field may be utilized by the crowdworker to browse through the partitions contained in a task. In an embodiment, the post-processed identification field may be obtained from the pre-processed identification field using a trapdoor function (e.g., RSA function).

At step 310, the one or more tasks are created. In an embodiment, for each electronic document of each second group, the processor 202 uses partitions with same values of the area identification number to create the one or more tasks. For example, a second group includes two electronic documents. Each of the two electronic documents has been partitioned into three partitions, such that corresponding partitions in the two electronic documents have same value of the area identification number. Thereafter, the processor 202 extracts one partition from each of the two electronic documents (with same value of the area identification number) to create a task. It will be apparent to a person having ordinary skill in the art that, in a similar way, two or more tasks may be created (from the remaining two partitions of each electronic document) by the processor 202.

At step 312, the one or more partitions in the one or more tasks are permuted in a random order. In an embodiment, the processor 202 may use one or more methods known in the art, to permute the one or more partitions such that the tasks assigned to the one or more crowdworkers contain random partitions.

At step 314, the one or more tasks are uploaded to a crowdsourcing platform. The processor 202 may upload the one or more tasks to the one or more crowdsourcing platforms, from where the one or more crowdworkers attempt the tasks. As the tasks are uploaded on the crowdsourcing platform, the probability that no crowdworker receives two or more partitions from same electronic document is given by:

$$e^{\frac{-m(m-1)f}{2ch}} \quad (1)$$

where,
 f=total number of the electronic documents
 h=number of the electronic documents in each of the second groups
 m=number of partitions in which each of the electronic document has been partitioned
 c=number of crowdworkers.

In an embodiment, the partitions from the one or more electronic documents are distributed to a crowdworker according to Poisson's distribution. In an embodiment, following equation depicts the Poisson's distribution of the one or more partitions:

$$h * \text{Poisson}\left(\frac{mf}{ch}\right) \quad (2)$$

As the partitions in the one or more tasks are permuted, distribution of a pair of partitions that comes from the same electronic document is given by:

$$\frac{f}{2} N\left(\frac{m^2}{c^2}, \frac{2\frac{m^2}{c^2} + 4\frac{m^3}{c^3}}{\frac{f}{h}}\right) \quad (3)$$

where, $N(\mu, \sigma^2)$ refers to the Normal (or Gaussian) distribution with mean $\mu$ and variance $\sigma^2$.

In case, the crowdworker tries to identify partitions that belong to same electronic document, the probability that crowdworker will incorrectly identify at least dl pairs of partitions to be from same electronic document, given that the crowdworker has correctly identified l pairs of partitions from the same electronic document, is illustrated by the following equation:

$$P(Y \geq dl) \geq (1 - 2*10^{-9})\left(1 - q^{k_1 - \frac{f}{2}(\mu + 6\sigma)} - \frac{q^{k_1 - \frac{f}{2}(d+1)(\mu + 6\sigma)}\left(\left(k_2 - \frac{f}{2}(\mu - 6\sigma)\right)e\right)^{\frac{df}{2}(\mu + 6\sigma)}(1-q)^{\frac{df}{2}(\mu + 6\sigma)}}{\frac{df}{2}(\mu + 6\sigma)^{\frac{df}{2}(\mu + 6\sigma) - 1}}\right) \quad (4)$$

where, $$\mu = \frac{m^2}{c^2}$$

$$\sigma = \sqrt{\frac{2\frac{m^2}{c^2} + 4\frac{m^3}{c^3}}{\frac{f}{h}}}$$

$$k_1 = \binom{\lfloor \mu_1 - 6\sigma_1 \rfloor}{2}$$

$$k_2 = \binom{\lfloor \mu_1 + 6\sigma_1 \rfloor}{2},$$

such that $$\sigma_1^2 = \frac{mfh}{c}$$

and $$\mu_1 = \frac{mf}{c}$$

q=probability that a crowdworker correctly identifies that the two partitions, which he receives as a task, are from different electronic documents.

Considering an example, when f=1000000, c=1000, m=5, h=50, q=0.6, and d=10, equation (4) provides $$P(Y \geq dl) \geq 1 - (4*10^{-9})$$

Thus, it can be observed that the probability that the crowdworker will incorrectly identify at least 10l pairs of partitions to be from the same electronic document (for every l pairs of partitions identified correctly) is quite high. Therefore, it is apparent that there is a very high probability that a malicious crowdworker, attempting to violate the privacy, will incorrectly identify several pairs of the partitions to be from same electronic document for every correctly identified pair of partitions.

Figure 4:
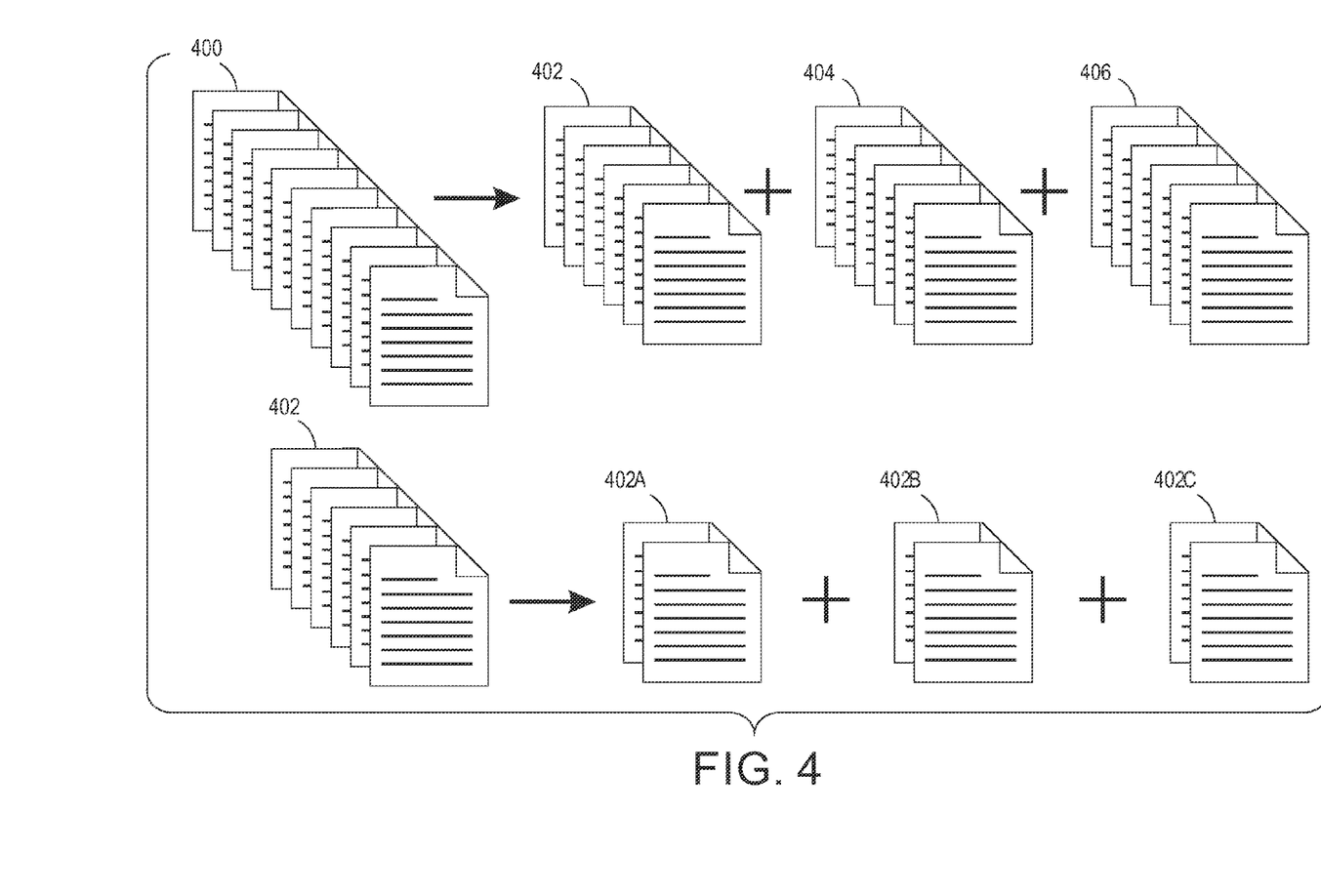
FIG. 4 illustrates a series of images, in accordance with at least one embodiment.

FIG. 4 illustrates a series of images, in accordance with at least one embodiment of the present disclosure. FIG. 4 illustrates one or more electronic documents 400, one or more first groups 402, 404, and 406, and one or more second groups 402a, 402b, 402c. In an embodiment, the one or more electronic documents 400 are obtained by scanning one or more documents (not shown) pertaining to insurance forms. The one or more electronic documents 400 include various handwritten information pertaining to the user associated with the insurance form such as name, address, date of birth, telephone number, etc., which the crowdworkers need to digitize. FIG. 4 will now be described in conjunction with FIG. 3.

In accordance with step 302, the one or more electronic documents 400 are clustered into the one or more first groups 402, 404, and 406. As discussed in FIG. 3, the one or more electronic documents 400 are clustered into the one or more first groups 402, 404, and 406 based on the similarity of handwriting in the one or more electronic documents 400. It will be understood by the person having ordinary skill in the art that the one or more first groups 402, 404, and 406 may have any random number of the electronic documents, depending on the identified similarity. Further, there might be a need to further divide the electronic documents in each of the one or more first groups 402, 404, and 406 into the one or more second groups.

In accordance with step 304, electronic documents in each of the one or more first groups are further divided into the one or more second groups. As illustrated in FIG. 4, the electronic documents in the first group 402 are divided into the one or more second groups 402a-c. In an embodiment, each of the first group is divided in the one or more second groups such that each of the second groups includes h electronic documents.

Figure 5:
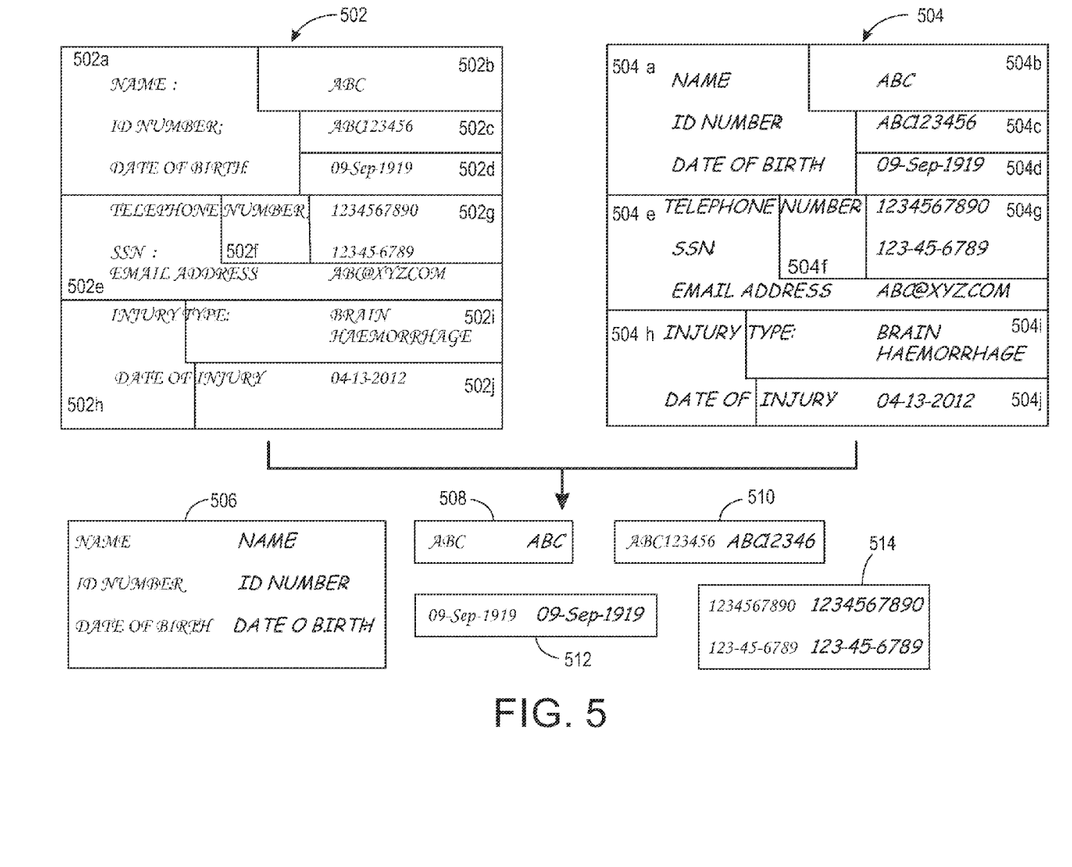
FIG. 5 illustrates two electronic documents and one or more tasks, in accordance with at least one embodiment.

FIG. 5 illustrates two electronic documents 502 and 504 and one or more tasks 506-514. The two electronic documents 502 and 504 correspond to the second group 402a (depicted in FIG. 4).

In accordance with step 306, the two electronic documents 502 and 504 are partitioned into the one or more partitions 502a-j and 504a-j, respectively. As depicted in the FIG. 5, partitioning is performed such that with any information included in any of the one or more partitions 502a-j or 504a-j, privacy of the user associated with the electronic document can be maintained. For example, name of the user "ABC" is in a different partition (depicted by 502b) than the partition of the id number "ABC123456" (depicted by 502c). In an embodiment, the processor 202 may partition the electronic documents 502 and 504 using one or more image processing algorithms known in the art. In an alternate embodiment, the partitioning of the electronic documents 502 and 504 may be defined by using a marking device (e.g., a mouse, a joystick, etc.). In an embodiment, each of the electronic documents (out of h electronic documents in each second group) is partitioned into m separate partitions.

In accordance with step 308, each partition of the one or more partitions 502*a-j* and 504*a-j* is assigned an area identification number. For example, for a scenario where 1000 electronic documents are to be digitized, the processor 202 may assign a 20 bit pre-processed identification field to each partition, out of which the first 10 bits (i.e., $\lceil \lg 1000 \rceil$) are representative of individual electronic documents out of the 1000 electronic documents, the next 4 bits (i.e., $\lceil \lg 10 \rceil$, since each of the electronic document has been partitioned into 10 partitions) are representative of the one or more partitions, and the last 6 bits may be any random number. As discussed in the description of FIG. 3, the area identification number for the one or more partitions 502*a-j* and 504*a-j* will be 4 bits after the initial 10 bits. Further, the processor 202 may assign a post-processed identification field to each partition. The post-processed identification field may be obtained using a trapdoor function on the pre-processed identification field. Table 1 provides an illustration of the pre-processed identification field and post-processed identification field assigned to the one or more partitions 502*a-j* and 504*a-j*:

TABLE 1

Illustration of pre-processed identification field, post-processed identification field, and the area identification number.

| Partition | Pre-processed identification field | Post-processed identification field | Area identification number |
| --- | --- | --- | --- |
| 502a | 0000000000-0001-010001 | 1000100001-0101-100010 | 0001 |
| 502b | 0000000000-0010-110010 | 0100110100-0111-111110 | 0010 |
| 502c | 0000000000-0011-100001 | 1110010101-0111-110000 | 0011 |
| 502d | 0000000000-0100-110000 | 1010001111-0100-000010 | 0100 |
| 502g | 0000000000-0111-101010 | 1010100001-1101-001001 | 0111 |
| 504a | 0000000001-0001-110110 | 1111010000-1111-010101 | 0001 |
| 504b | 0000000001-0010-111000 | 1100101001-1001-010101 | 0010 |
| 504c | 0000000001-0011-101111 | 1111111010-1010-111000 | 0011 |
| 504d | 0000000001-0100-001111 | 0101000001-0110-001010 | 0100 |
| 504g | 0000000001-0111-001100 | 1011101000-1010-001110 | 0111 |

In accordance with step 310, the one or more tasks 506-514 are created. In an embodiment, the processor 202 uses partitions from the electronic document 502 and 504 with same area identification number to create one task. For example, as depicted in FIG. 5, partitions 502*a* and 504*a* (which have same area identification number) from both the electronic documents 502 and 504 are used to create the task 506. It will be apparent to a person having ordinary skills in the art that though for example purposes only two electronic documents have been considered, each task will have a partition from each of the h electronic documents of the second group. That is, each task will have h different partitions (one from each of the h electronic documents) with same area identification number.

In accordance with step 312, the partitions in the one or more tasks 506-514 are permuted. In an embodiment, the processor 202 permutes the partitions in the one or more tasks 506-514 in a random order such that the one or more tasks 506-514 assigned to the one or more crowdworkers contain partitions in a random order.

In accordance with step 314, the one or more tasks are uploaded to the crowdsourcing platform, from where the one or more tasks are attempted by the one or more crowdworkers.

The disclosed embodiments encompass numerous advantages. Each of the one or more tasks is created from a second group such that the second group has the electronic documents with similar handwriting. Thus, a two-fold privacy is achieved for the tasks created for these electronic documents: first, partitions for the one or more tasks are taken from the electronic documents with similar handwriting and second, partitions have been defined such that no partition alone reveals the complete privacy information of the user associated with the electronic document. Also, the probability that a crowdworker will receive two or more partitions from the same electronic document is quite low (as provided by equation (1)). Further, the probability that a crowdworker will be successful in identifying two partitions to be from same electronic document is very low. Even if a malicious crowdworker pro-actively attempts to identify the privacy information included in the electronic documents, for every pair of partitions identified by the crowdworker correctly, there is a very high probability the crowdworker will identify several pairs of partitions incorrectly (as provided by equation 4).

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as, a floppy-disk drive, optical-disk drive, and the like. The storage device may also be a means for loading computer programs or other instructions into the computer system. The computer system also includes a communication unit. The communication unit allows the computer to connect to other databases and the Internet through an input/output (I/O) interface, allowing the transfer as well as reception of data from other sources. The communication unit may include a modem, an Ethernet card, or other similar devices, which enable the computer system to connect to databases and networks, such as, LAN, MAN, WAN, and the Internet. The computer system facilitates input from a user through input devices accessible to the system through an I/O interface.

In order to process input data, the computer system executes a set of instructions that are stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or using only hardware or by a varying combination of the two techniques. The disclosure is independent of the programming language and the operating system used in the computers. The instructions for the disclosure can be written in all programming languages including, but not limited to, 'C', 'C++', 'Visual C++' and 'Visual Basic'. Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms including, but not limited to, 'Unix', 'DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for creating one or more tasks have been disclosed. However, it should be apparent to those skilled in the art that modifications in addition to those described, are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skills in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, or the like.

The claims can encompass embodiments for hardware, software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method for creating one or more tasks, by a computing device, for crowdsourcing, the method comprising:

receiving, by a transceiver at the computing device, a plurality of electronic documents from a requestor-computing device over a network;

clustering, by one or more processors at the computing device, the received plurality of electronic documents in one or more first groups based on information retrieved from a storage device, wherein the retrieved information corresponds to a similarity of handwriting in the plurality of electronic documents;

for a group in the one or more first groups:

partitioning, by the one or more processors, each electronic document of the plurality of electronic documents of the group into a plurality of first partitions based on a predefined number of partitions, wherein each of the plurality of first partitions comprises a part of a corresponding electronic document different from remaining first partitions of the corresponding electronic document, and wherein each of the plurality of first partitions is partitioned to prevent information in each of the plurality of first partitions from being correlated with a subject of the electronic document;

assigning, by the one or more processors, an area identification number to each of the plurality of first partitions of each electronic document, wherein the area identification number is determined based on the predefined number of partitions;

creating, by the one or more processors, the one or more tasks, wherein each created task of the created one or more tasks includes a plurality of second partitions, each having same area identification number, wherein each second partition is selected from the plurality of first partitions of the corresponding electronic document of the plurality of electronic documents of the group, and wherein the plurality of second partitions in the one or more tasks are permuted to randomize second partitions included in the one or more tasks;

assigning, by the one or more processors, a post-processed identification field to each first partition of the plurality of first partitions prior to creation of the one or more tasks, wherein the post-processed identification field is used by the one or more crowdworkers to identify one of the plurality of second partitions associated with a corresponding created task of the created one or more tasks on the presented UI, wherein the post-processed identification field is obtained by applying a trapdoor function on a pre-processed identification field, wherein the pre-processed identification field is determined based on at least number of electronic documents in the group and the predefined number of partitions, and wherein the area identification number is included in the pre-processed identification field; and transmitting, by the transceiver, the created one or more tasks of the one or more first groups to a crowdsourcing platform for crowdsourcing over the network, wherein the crowdsourcing platform presents a user interface (UI) to access the created one or more tasks for execution by one or more crowdworkers associated with the crowdsourcing platform wherein such that privacy of complete information of each electronic document is maintained.

2. The method of claim 1 further comprising generating, by the one or more processors, one or more second groups from each of the one or more first groups.

3. The method of claim 1 further comprising permuting, by the one or more processors, the plurality of second partitions in each of the created one or more tasks to randomly arrange the plurality of second partitions in each of the created one or more tasks.

4. The method of claim 1, wherein the plurality of electronic documents is obtained by scanning a plurality of documents that includes handwritten text.

5. The method of claim 4, wherein each of the plurality of electronic documents corresponds to an insurance form.

6. A method for creating one or more tasks, by a computing device, for crowdsourcing, the method comprising:
  receiving, by a transceiver at the computing device, a plurality of electronic documents from a requestor-computing device over a network;
  clustering, by one or more processors at the computing device, the received plurality of electronic documents in one or more first groups based on information retrieved from a storage device, wherein the retrieved information corresponds to a similarity of handwriting in the plurality of electronic documents;
  generating, by the one or more processors, one or more second groups from each of the one or more first groups based on a predefined number of electronic documents to be included in the one or more second groups;
  for a group in the one or more second groups:
    partitioning, by the one or more processors, each electronic document of the plurality of electronic documents of the group into a plurality of first partitions based on a predefined number of partitions,
      wherein each of the plurality of first partitions comprises a part of a corresponding electronic document different from remaining first partitions of the corresponding electronic document, and
      wherein each of the plurality of first partitions is partitioned to prevent information in each of the plurality of first partitions from being correlated with a subject of the electronic document;
    assigning, by the one or more processors, an area identification number to each of the plurality of first partitions of each electronic document, wherein the area identification number is determined based on the predefined number of partitions;
    creating, by the one or more processors, the one or more tasks, wherein each created task of the created one or more tasks includes a plurality of second partitions having same area identification number, wherein each second partition is selected from the plurality of first partitions of the corresponding electronic document of the plurality of electronic documents of the group;
    assigning, by the one or more processors, a post-processed identification field to each first partition of the plurality of first partitions prior to creation of the one or more tasks, wherein the post-processed identification field is used by the one or more crowdworkers to identify one of the plurality of second partitions associated with a corresponding created task of the created one or more tasks on the presented UI,
      wherein the post-processed identification field is obtained by applying a trapdoor function on a pre-processed identification field, wherein the pre-processed identification field is determined based on at least number of electronic documents in the group and the predefined number of partitions, and wherein the area identification number is included in the pre-processed identification field;
    permuting, by the one or more processors, the plurality of second partitions in each of the created one or more tasks to randomly arrange the plurality of second partitions in each of the created one or more tasks; and
    transmitting, by the transceiver, the created one or more tasks to a crowdsourcing platform for crowdsourcing over the network, wherein the crowdsourcing platform presents a user interface (UI) to access the created one or more tasks for execution by one or more crowdworkers associated with the crowdsourcing platform such that privacy of complete information of each electronic document is maintained.

7. A system for creating one or more tasks, by a computing device, for crowdsourcing, the system comprising:
  a transceiver in the computing device operable to receive a plurality of electronic documents from a requestor-computing device over a network;
  one or more processors in the computing device operable to:
  cluster received the plurality of electronic documents in one or more first groups based on information retrieved from a storage device, wherein the retrieved information corresponds to a similarity of handwriting in the plurality of electronic documents;
  for a group in the one or more first groups:
    partition each electronic document of the plurality of electronic documents of the group into a plurality of first partitions based on a predefined number of partitions,
      wherein each of the plurality of first partitions comprises a part of a corresponding electronic document different from remaining first partitions of the corresponding electronic document, and
      wherein each of the plurality of first partitions is partitioned to prevent information in each of the plurality of first partitions from being correlated with a subject of the electronic document;
    assign an area identification number to each of the plurality of first partitions of each electronic document, wherein the area identification number is determined based on the predefined number of partitions;
    create the one or more tasks, wherein each created task of the created one or more tasks includes a plurality of second partitions, each having same area identification number,
      wherein each second partition is selected from the plurality of first partitions of the corresponding electronic document of the plurality of electronic documents of the group, and
      wherein the plurality of second partitions in the one or more tasks are permuted to randomize second partitions included in the one or more tasks;
    assign a post-processed identification field to each first partition of the plurality of first partitions prior to creation of the one or more tasks, wherein the post-processed identification field is used by the one or more crowdworkers to identify one of the plurality of second partitions associated with a corresponding created task of the created one or more tasks on the presented UI, wherein the post-processed identification field is obtained by applying a trapdoor function on a pre-processed identification field, wherein the pre-processed identification field is determined based on at least number of electronic documents in the group and the predefined number of partitions, and wherein the area identification number is included in the pre-processed identification field; and the transceiver is further operable to transmit the created one or more tasks of the one or more first groups to a crowdsourcing platform for crowdsourcing over the network, wherein the crowdsourcing platform presents a user interface (UI) to access the created one or more tasks for execution by one or more crowdworkers associated with the crowdsourcing platform such that privacy of complete information of each electronic document is maintained.

8. The system of claim 7, wherein the one or more processors are further operable to generate one or more second groups from each of the one or more first groups.

9. The system of claim 7, wherein the one or more processors are further operable to permute the plurality of second partitions in each of the created one or more tasks to randomly arrange the plurality of second partitions in each of the created one or more tasks.

10. A system for creating one or more tasks, by a computing device, for crowdsourcing, the system comprising:

a transceiver in the computing device operable to receive a plurality of electronic documents from a requestor-computing device over a network;

one or more processors in the computing device operable to:

cluster received the plurality of electronic documents in one or more first groups based on information retrieved from a storage device, wherein the retrieved information corresponds to a similarity of handwriting in the plurality of electronic documents;

generate one or more second groups from each of the one or more first groups based on a predefined number of electronic documents to be included in the one or more second groups;

for a group in the one or more second groups:

partition each electronic document of the plurality of electronic documents of the group into a plurality of first partitions based on a predefined number of partitions, wherein each of the plurality of first partitions comprises a part of a corresponding electronic document different from remaining first partitions of the corresponding electronic document, and wherein each of the plurality of first partitions is partitioned to prevent information in each of the plurality of first partitions from being correlated with a subject of the electronic document;

assign an area identification number to each of the plurality of first partitions of each electronic document, wherein the area identification number is determined based on the predefined number of partitions;

create the one or more tasks, wherein each created task of the created one or more tasks includes a plurality of second partitions having same area identification number, wherein each second partition is selected from the plurality of first partitions of the corresponding electronic document of the plurality of electronic documents of the group;

assign a post-processed identification field to each first partition of the plurality of first partitions prior to creation of the one or more tasks, wherein the post-processed identification field is used by the one or more crowdworkers to identify one of the plurality of second partitions associated with a corresponding created task of the created one or more tasks on the presented UI, wherein the post-processed identification field is obtained by applying a trapdoor function on a pre-processed identification field, wherein the pre-processed identification field is determined based on at least number of electronic documents in the group and the predefined number of partitions, and wherein the area identification number is included in the pre-processed identification field;

permute the plurality of second partitions in each of the created one or more tasks to randomly arrange the plurality of second partitions in each of the created one or more tasks; and the transceiver is further operable to transmit the created one or more tasks to a crowdsourcing platform for crowdsourcing over the network, wherein the crowdsourcing platform presents a user interface (UI) to access the created one or more tasks for execution by one or more crowdworkers associated with the crowdsourcing platform such that privacy of complete information of each electronic document is maintained.

11. A computer program product for use with a computer, the computer program product comprising a non-transitory computer readable medium, wherein the non-transitory computer readable medium stores a computer program code for creating one or more tasks for crowdsourcing, wherein the computer program code is executable by one or more processors to:

receive a plurality of electronic documents from a requestor-computing device over a network;

cluster received the plurality of electronic documents in one or more first groups based on information retrieved from a storage device, wherein the retrieved information corresponds to a similarity of handwriting in the plurality of electronic documents;

for a group in the one or more first groups:

partition each electronic document of the plurality of electronic documents of the group into a plurality of first partitions based on a predefined number of partitions, wherein each of the plurality of first partitions comprises a part of a corresponding electronic document different from remaining first partitions of the corresponding electronic document, and wherein each of the plurality of first partitions is partitioned to prevent information in each of the plurality of first partitions from being correlated with a subject of the electronic document;

assign an area identification number to each of the plurality of first partitions of each electronic document, wherein the area identification number is determined based on the predefined number of partitions;

create the one or more tasks, wherein each created task of the created one or more tasks includes a plurality of second partitions, each having same area identification number, wherein each second partition is selected from the plurality of first partitions of the corresponding electronic document of the plurality of electronic documents of the group, and wherein the plurality of second partitions in the one or more tasks are permuted to randomize second partitions included in the one or more tasks;

assign a post-processed identification field to each first partition of the plurality of first partitions prior to creation of the one or more tasks, wherein the post-processed identification field is used by the one or more crowdworkers to identify one of the plurality of second partitions associated with a corresponding created task of the created one or more tasks on the presented UI, wherein the post-processed identification field is obtained by applying a trapdoor function on a pre-processed identification field, wherein the pre-processed identification field is determined based on at least number of electronic documents in the group and the predefined number of partitions, and wherein the area identification number is included in the pre-processed identification field; and transmit the created one or more tasks of the one or more first groups to a crowdsourcing platform for crowdsourcing over the network, wherein the crowdsourcing platform presents a user interface (UI) to access the created one or more tasks for execution by one or more crowdworkers associated with the crowdsourcing platform such that privacy of complete information of each electronic document is maintained.

12. A computer program product for use with a computer, the computer program product comprising a non-transitory computer readable medium, wherein the non-transitory computer readable medium stores a computer program code for creating one or more tasks for crowdsourcing, wherein the computer program code is executable by one or more processors to:

receive a plurality of electronic documents from a requestor-computing device over a network;

cluster received the plurality of electronic documents in one or more first groups based on information retrieved from a storage device, wherein the retrieved information corresponds to a similarity of handwriting in the plurality of electronic documents;

generate one or more second groups from each of the one or more first groups based on a predefined number of electronic documents to be included in the one or more second groups;

for a group in the one or more second groups:

partition each electronic document of the plurality of electronic documents of the group into a plurality of first partitions based on a predefined number of partitions, wherein each of the plurality of first partitions comprises a part of a corresponding electronic document different from remaining first partitions of the corresponding electronic document, and wherein each of the plurality of first partitions is partitioned to prevent information in each of the plurality of first partitions from being correlated with a subject of the electronic document;

assign an area identification number to each of the plurality of first partitions of each electronic document, wherein the area identification number is determined based on the predefined number of partitions;

create the one or more tasks, wherein each created task of the created one or more tasks includes a plurality of second partitions having same area identification number, wherein each second partition is selected from the plurality of first partitions of the corresponding electronic document of the plurality of electronic documents of the group;

assign a post-processed identification field to each first partition of the plurality of first partitions prior to creation of the one or more tasks, wherein the post-processed identification field is used by the one or more crowdworkers to identify one of the plurality of second partitions associated with a corresponding created task of the created one or more tasks on the presented UI, wherein the post-processed identification field is obtained by applying a trapdoor function on a pre-processed identification field, wherein the pre-processed identification field is determined based on at least number of electronic documents in the group and the predefined number of partitions, and wherein the area identification number is included in the pre-processed identification field;

permute the plurality of second partitions in each of the created one or more tasks to randomly arrange the plurality of second partitions in each of the created one or more tasks; and transmit the created one or more tasks to a crowdsourcing platform for crowdsourcing over the network, wherein the crowdsourcing platform presents a user interface (UI) to access the created one or more tasks for execution by one or more crowdworkers associated with the crowdsourcing platform such that privacy of complete information of each electronic document is maintained.

* * * * *